March 6, 1951 H. A. SCHURICHT 2,543,991
SPRING FORK MECHANISM
Filed June 5, 1948 2 Sheets-Sheet 2
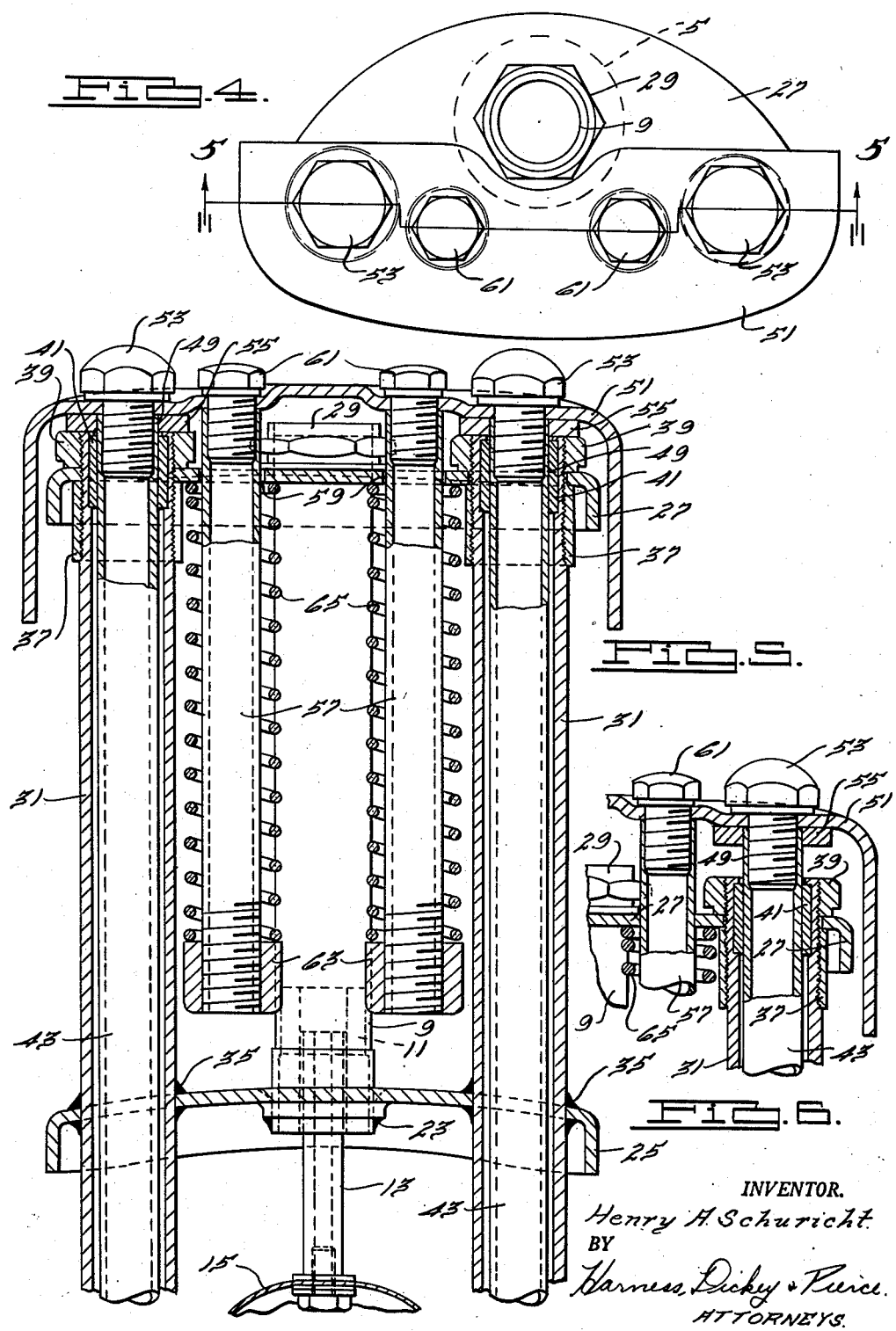
INVENTOR.
Henry A. Schuricht
BY
Harness, Dickey & Pierce
ATTORNEYS.

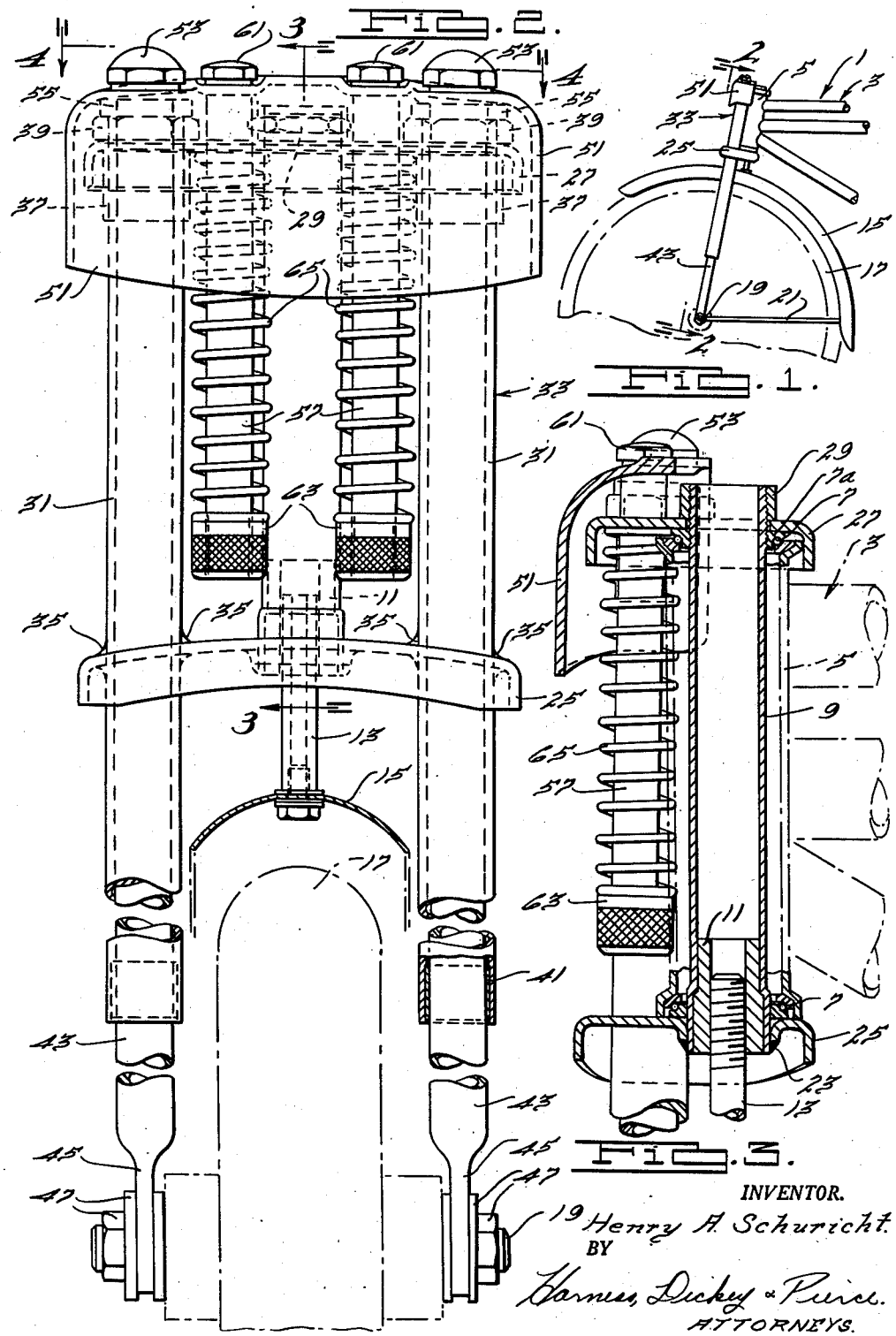

Patented Mar. 6, 1951

2,543,991

UNITED STATES PATENT OFFICE 2,543,991

SPRING FORK MECHANISM

Henry A. Schuricht, Pontiac, Mich., assignor to Whizzer Motor Company, Pontiac, Mich., a corporation of Delaware Application June 5, 1948, Serial No. 31,307

1 Claim. (Cl. 280—276)

This invention relates to the construction of velocipedes, bicycles, motorbikes, motorcycles and the like and, in particular, refers to a resilient fork support mechanism for the front wheels thereof.

Front fork support mechanisms of the type herein referred to are required to properly and rigidly support a wheel for rotation and at the same time to permit a yieldable, shock absorbing translation of the wheel in a substantially vertical direction toward or away from the vehicle frame. They must also be capable of operative connection to a steering post for pivotal movement with respect to the frame. In designing fork support mechanisms to meet these requirements, it has been necessary heretofore to sacrifice in the performance of one function in order to permit satisfactory performance of another. The most common problem has involved a balancing of the shock absorbing function against the strength and structural soundness of the means for rotatably connecting the wheel to the frame. It will be recognized that under these conditions, the wheel support structure is weakened to the extent that it has been adapted to perform the shock absorbing function.

Accordingly, it is the geenral object of this invention to provide a fork support mechanism in which there is no conflict between the optimum structures for the performance of the various required functions.

A more particular object is to provide a fork support mechanism in which a very strong structure for rotatably connecting a steering wheel to the frame is combined with a shock absorbing means that is capable of independent adjustment.

The preferred embodiment of the invention as applied to the front wheel of a bicycle is shown in the drawings in which:

Figure 1 is a side elevation with parts removed and parts broken away of the front wheel of a bicycle embodying the invention;

Fig. 2 is a front elevation of a spring fork mechanism in accordance with the invention such as may be taken along the line 2—2 of Fig. 1;

Fig. 3 is a section with parts broken away along the line 3—3 of Fig. 2;

Fig. 4 is a plan view of the device of Fig. 2;

Fig. 5 is a section along the line 5—5 of Fig. 4; and

Fig. 6 is a cross section with parts removed and broken away of the improved device showing the shock absorber springs in compressed position.

Referring to the drawings, the bicycle I has a frame 3 terminating at its forward end in a hollow steering post housing 5. As shown in Fig. 3, the housing 5 may have suitable thrust and rotary bearings 7 for rotatably supporting a steering post 9, which forms a part of the fork mechanism to be described presently. The post 9 may be hollow and have a suitable plug 11 therein to threadably support a stud 13 which holds a mud-guard or fender 15 for the wheel 17. The wheel 17 has a rotary axle 19 to which may be attached additional side braces 21 for the fender 15.

The bottom end of the steering post 9 is rigidly and preferably permanently connected by suitable means such as the weld 23 to a lower crosshead 25. After the post 9 is inserted upwardly through housing 5 its top end may be rigidly connected to the upper crosshead 27 by suitable means such as a lock nut 29 threaded thereon and coacting with a threaded ball race 7a on the post.

Laterally spaced, elongated tubular bearing and support members 31 are rigidly and preferably permanently connected to the crosshead 25 by welding at 35 or otherwise. The members 31 are preferably hollow or tubular and clamped by bushings 37 and locknuts 39 thereon to the upper crosshead 27. The upper and lower ends of the tubular members 31 carry internal bushings 41 and through these slidably extend the fork arms 43 which are also preferably tubular to provide a high ratio of strength to weight. The lower ends 45 of the fork arms 43 are adapted for and connected to the wheel axle 19 in the conventional manner as shown at 47. The upper ends 49 of the fork arms are rigidly connected above the crosshead 27 to a movable crosshead or crown 51. For this purpose they may be internally threaded to receive cap screws 53 which clamp the crosshead 51 to the ends 49 of the arms. Alignment and spacer washers 55 may be affixed at this junction if desired.

A suitable shock absorbing means is connected between the upper crosshead 27 and the crown 51 and this preferably includes downwardly extending studs 57 passing through apertures 59 in the upper crosshead 27 and rigidly connected to the crown 51 by means of cap screws 61. Threadably affixed to the lower ends of the studs 57 are the knurled spring abutments 63 and between these and the underside of the crosshead 27 are disposed the compression springs 65 which surround the studs. As an alternative construction, tension springs (not shown) could obviously also be connected between the crown 51 and the lower crosshead 25 for shock absorbing purposes.

In operation, forces applied to the wheel 17 at its point of contact with the roadway are transmitted up the fork arms 43 to the crosshead 51 from the wheel axle 19. If these loads are of sufficient magnitude to overcome the initial settings of the springs 65, the fork arms 43 and the connected crown 51 move upwardly in the bearing bushing 41, relative to the members 31 and crosshead 27 as shown in Figure 6 so that the energy of the shock load is absorbed by the upward translation of the wheel 17 against the yieldable resistance of the springs 65.

It will be apparent that if turning forces are suitably applied the torque will be transmitted from the fork housing 33 to the arms 43 and thence to the wheel axle 19. Thus, the wheel 17 is operatively connected for turning to the steering post 9 which rotates on the bearings 7 in the housing 5 as hereinbefore described.

Distortion of any fork mechanism is caused by lateral or side loads applied to the wheel 17. In the structure shown, the widely spaced bearings 41 for the arms 43 provide a much larger moment of resistance to such loads than heretofore obtained. Hence, the strength and rigidity of the mechanism is substantially increased. This is independent of the characteristics of the shock absorbing means which may be regulated in any desired manner by controlling the properties of the springs 65 as by the threaded abutments 63 to vary the initial setting thereof or by changing springs. In addition the fork arms 43 are rigidly connected together both above and below the tubular members 31 in which they slide, thus insuring a strong, rigid construction in which loads are distributed equally between the members 31.

Various modifications may be made within the scope of the invention, hence it is not intended to limit it to the afore-described construction.

What is claimed is:

In a bicycle, the combination of a frame having a cylindrical tube providing a steering post housing, a cylindrical tube providing a steering post mounted in said housing, a dished plate welded beneath the housing to the bottom of said post and providing a lower crosshead, a second dished plate above the housing providing an upper crosshead, said housing having radial shoulders adjacent each end, upper and lower ball bearing devices each having an outer race engaging a surface of the crosshead and an inner race engaging one of said shoulders of the housing, said post being rotatably mounted on the bearing devices, the upper end of said post extending above the upper crosshead and being threaded, a threaded member on the upper end of the post and shouldering on said upper crosshead to clamp the crossheads and housing together, said lower crosshead having a pair of laterally spaced apertures spaced forwardly of said post, said upper crosshead having a pair of apertures longitudinally aligned with the apertures in the lower crosshead and spaced forwardly of said post, a pair of cylindrical tubes extending through the apertures in the crossheads and welded to said lower crosshead, said pair of tubes extending a substantial distance below the lower crosshead and for a slight distance above the upper crosshead and being exteriorly threaded above and for a short distance below said upper crosshead, threaded members on the threaded upper ends of the housings on opposite sides of the upper crosshead serving to clamp the housings to the upper crosshead, a pair of cylindrical tubes slidably extending through said pair of tubes that are clamped to the upper crosshead, the lower ends of said slidable tubes being adapted to receive an axle, the upper ends of said slidable tubes being interiorly threaded, an angular plate forming an apron on the side of the upper ends of the housings opposite the steering post and providing a movable crosshead in abutment with the ends of the slidable tubes, said movable crosshead having apertures of the same diameter as and aligned with the interior threaded portion of the slidable tubes, threaded members having shoulders engaging the outer surface of the movable crosshead and having shanks extending through said last-mentioned apertures and threadably engaging the threaded ends of the slidable tubes to thereby clamp the crosshead against the abutting ends of the slidable tubes, said movable crosshead having a pair of laterally spaced apertures and said upper crosshead having a pair of laterally spaced apertures aligned with the last-mentioned apertures, a pair of elongated members extending through the last-mentioned apertures in the upper crosshead and having interiorly threaded upper ends abutting the movable crosshead and in alignment with the last-mentioned apertures in the upper crosshead, threaded members having shoulders engaging the outer side of the movable crosshead and threadably engaging the upper ends of the elongated members to clamp the movable crosshead between the shoulders and the abutting ends of the elongated members, threaded members adjustably mounted on the lower ends of the elongated members, and springs on the elongated members between the upper crosshead and the last-mentioned threaded members to yieldably urge the movable crosshead toward the upper crosshead.

HENRY A. SCHURICHT.

REFERENCES CITED

The following references are of record in the file of this patent:

FOREIGN PATENTS

| Number | Country | Date |
|---|---|---|
| 657,016 | France | Jan. 11, 1929 |
| 327,562 | Great Britain | Apr. 10, 1930 |